United States Patent [19]
Brown

[11] Patent Number: 6,161,998
[45] Date of Patent: Dec. 19, 2000

[54] BLIND RIVET CONNECTOR

[75] Inventor: David M Brown, Chester, United Kingdom

[73] Assignee: BAE Systems plc, Farnborough, United Kingdom

[21] Appl. No.: 09/397,145

[22] Filed: Sep. 16, 1999

Related U.S. Application Data

[63] Continuation of application No. PCT/GB99/00478, Feb. 15, 1999.

[30] Foreign Application Priority Data

Feb. 18, 1998 [GB] United Kingdom .................. 9803314

[51] Int. Cl.⁷ .............................. F16B 13/04; F16B 39/28
[52] U.S. Cl. ............................. 411/34; 411/113; 411/183
[58] Field of Search ................... 411/34–38, 43, 411/55, 113, 183, 967

[56] References Cited

U.S. PATENT DOCUMENTS

| | | | |
|---|---|---|---|
| 3,369,442 | 2/1968 | Darby et al. | 411/34 |
| 3,461,771 | 8/1969 | Briles | 411/34 |
| 4,560,312 | 12/1985 | Grady . | |
| 4,919,578 | 4/1990 | Zeigler et al. . | |
| 5,294,223 | 3/1994 | Phillips, II | 411/183 X |

FOREIGN PATENT DOCUMENTS

| | | |
|---|---|---|
| 2 721 967 | 1/1996 | France . |
| 12 86 812 | 1/1969 | Germany . |

*Primary Examiner*—Neill Wilson
*Attorney, Agent, or Firm*—Nixon & Vanderhye P.C.

[57] ABSTRACT

An internally threaded blind rivet nut is provided. The nut includes adjacent a clinchable region 14 thereof a resilient collar 18 or peripheral region dimensioned such that in use, when the rivet nut is clinched, it is capable of limited axial and/or radial float.

10 Claims, 1 Drawing Sheet

BLIND RIVET CONNECTOR

This is a continuation of PCT application No. PCT/GB99/00478, filed Feb. 15, 1999, the entire content of which is hereby incorporated by reference in this application.

BACKGROUND OF THE INVENTION

1. Field of the Invention

This invention relates to blind rivet connectors and in particular, but not exclusively, to blind internally threaded rivets otherwise known as rivet nuts or "rivnuts".

2. Discussion of Prior Art

There are many situations where it is required to provide a panel or the like with a captive nut so the panel can be assembled in place relative to the surrounding structure using a threaded connector such as a bolt or screw. However a problem arises where access is available to one side only of the component and where the other side is not accessible or should not be perforated by an access hole. This is the case, for example where a component has been made by a super-plastic forming process which results in the component being made up of a series of closed cells.

Thus it is already known to make a hole in the sheet on one side of the panel and to insert therein a rivnut which is subsequently compressed using a mandrel so that it crimps intimately around the periphery of the hole thus preventing its withdrawal therefrom. However a problem arises in such arrangements because they do not allow axial or radial float and thus location and alignment of such panels during assembly is problematic. Therefore a need exists for an arrangement which allows a limited amount of radial and/or axial float to overcome the problems mentioned above, without requiring additional intrusion and machining.

SUMMARY OF THE INVENTION

Accordingly, in one aspect, this invention provides a blind rivet connector for being passed through a bore in a workpiece and clinched to prevent withdrawal, said connector comprising:

an enlarged reaction head portion for being retained by the workpiece surface to one side of the bore;

a tubular portion capable of passing through said bore and including:

remote from said head portion an end portion incorporating an internal releasable engagement configuration, and a plastically deformable region intermediate said end portion and said head portion, wherein said connector further includes a resilient peripheral region adjacent said head region, whereby, in use, the application of compression to clinch said connector causes said plastically deformable region to deform plastically, and said resilient peripheral region allows plastic deformation sufficient to prevent later removal of said connector but not to prevent limited radial float of said connector relative to said hole.

By this arrangement, float is achieved by preventing the rivnut from crimping intimately around the periphery of the bore. Thus limited amounts of radial float (and axial float if required) are achieved although the clinching of the connector still provides sufficient excrescence of material to prevent withdrawal of the connector when clinched.

Whilst the resilient peripheral region may be provided by means of locally thickening and/or locally hardening the material, the resilient peripheral region preferably comprises a separate relatively non-deformable collar of diameter less than that of the bore but of equal or greater axial dimension.

The rivet can incorporate various types of internal releasable engagement configuration, but it is preferred for the connector to incorporate an internal thread.

In another aspect, this invention provides an internally threaded blind rivet nut including adjacent the clinchable region thereof a resilient collar or peripheral region dimensioned such that in use, when said rivet nut is clinched it is capable of limited axial and/or radial float.

In yet another aspect, this invention provides a method of providing an internally threaded blind rivet nut with a limited degree of axial and/or radial float, which method comprises providing said rivet nut with a locally non-deformable region or collar adjacent the head thereof.

The invention also extends to an assembly comprising at least two components connected by means of the connector or rivet nut as described above.

BRIEF DESCRIPTION OF THE DRAWINGS

Whilst the invention has been described above, it extends to any inventive combination of the features set out above or in the following description. The invention may be performed in various ways, and an embodiment thereof will now be described in detail, reference being made to the accompanying drawings, in which.

DETAILED DISCUSSION OF PREFERRED EMBODIMENTS

Figure 1:
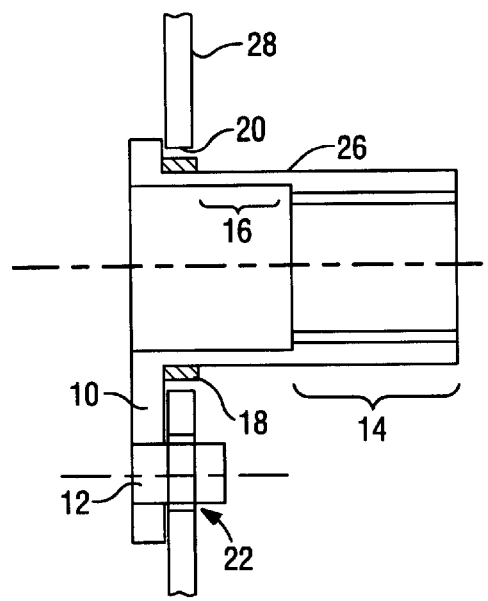
FIG. 1 is a schematic side view showing a rivet connector of this invention prior to clinching.
Figure 2:
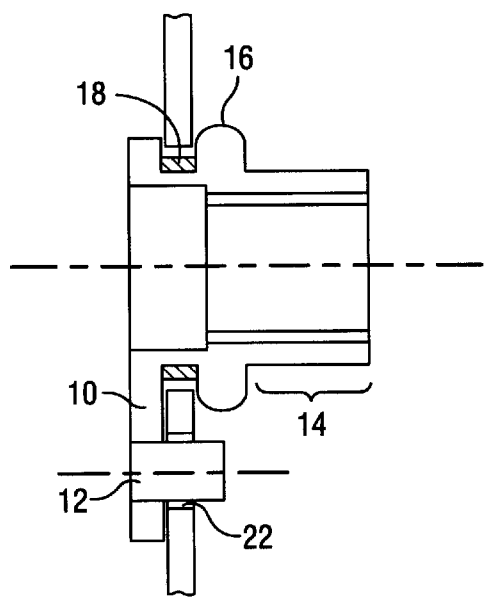
FIG. 2 is a schematic side view of the connector of FIG. 1 after clinching.
Figure 3:
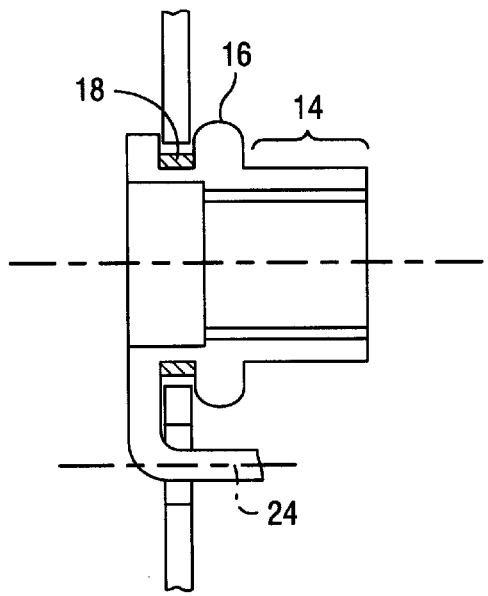
FIG. 3 is a schematic side view of a second embodiment of connector after clinching.

Referring to FIGS. 1 and 2, the rivet connector comprises a faceplate or reaction head 10 having an anti-rotation pin 12. A body of the rivet connector forms a generally tubular portion 26, comprising an internally releasable engagement configuration in the form of an internally threaded end portion 14 and a local plastically deformable region 16 intermediate the threaded end portion 14 and the faceplate 10. The rivet connector is modified by means of a resilient peripheral region in the form of a hard, substantially non-deformable collar 18 which fits snugly around the outside of the tubular portion 26, adjacent the face plate 10. The outer diameter of the collar 18 and its axial dimension are selected to be slightly less and slightly greater respectively than the diameter of the rivet body and the material thickness of a bore of the hole 20 through an associated component 28 through which the rivet connector is to be passed. The associated component 28 also includes adjacent the hole 20 a smaller non-rotation hole 22 which receives the pin 12 of the faceplate 10. This arrangement may however be modified as required; for example, as shown in FIG. 3, the pin 12 may be replaced by an integrally formed tang 24.

In use, once the rivet connector has been placed into position as seen in FIG. 1, a threaded mandrel (not shown) is screwed into engagement with the threaded portion 14 and a tensile force applied which is reacted by the faceplate 10 of the rivet connector thereby to compress the plastically deformable region 16 to cause it to bulge out and clinch. As seen in FIG. 2 the clinching is controlled by the presence of the collar 18 so that the excrescent material does not foul the periphery of the hole 20 so that, after clinching, the connector has limited axial and radial float.

What is claimed is:

1. A blind rivet connector for being passed through a bore in a workpiece and clinched to prevent withdrawal, said connector comprising:
   an enlarged reaction head portion for being retained by the workpiece surface to one side of the bore;
   a tubular portion capable of passing through said bore and including:
      remote from said head portion an end portion incorporating an internal releasable engagement configuration, and
      a plastically deformable region intermediate said end portion and said head portion,
   and a relatively non-deformable collar adjacent said head region, said collar of diameter less than said bore and axial dimension at least equal to that of said bore,
   whereby, in use, the application of compression to clinch said connector causes said plastically deformable region to deform plastically, and said non-deformable collar allows plastic deformation sufficient to prevent later removal of said connector but not to prevent limited radial float of said connector relative to said hole.

2. A connector according to claim 1, wherein said internal releasable engagement configuration comprises an internally screw-threaded portion.

3. An internally threaded blind rivet nut including adjacent the clinchable region thereof a non-deformable collar dimensioned such that in use, when said rivet nut is clinched it is capable of at least one of limited axial and radial float.

4. A blind rivet connector for being passed through a bore in a workpiece and clinched to prevent withdrawal, said connector comprising:
   an enlarged reaction head portion for being retained by the workpiece surface to one side of the bore;
   a tubular portion capable of passing through said bore and including:
      remote from said head portion an end portion incorporating an internal releasable engagement configuration, and
      a plastically deformable region intermediate said end portion and said head portion, and
   a relatively non-deformable collar adjacent said head region,
   whereby, in use, the application of compression to clinch said connector causes said plastically deformable region to deform plastically, and said non-deformable collar allows plastic deformation sufficient to prevent later removal of said connector but not to prevent limited radial float of said connector relative to said hole.

5. A connector according to claim 4, wherein said internal releasable engagement configuration comprises an internally screw-threaded portion.

6. A blind rivet connector for being passed through a bore in a workpiece and clinched to prevent withdrawal, said connector comprising:
   an enlarged reaction head portion for being retained by the workpiece surface to one side of the bore;
   a tubular portion capable of passing through said bore and including:
      remote from said head portion an end portion incorporating an internal releasable engagement configuration, and
      a plastically deformable region intermediate said end portion and said head portion,
   and a relatively non-deformable collar adjacent said head region, said collar of diameter less than said bore,
   whereby, in use, the application of compression to clinch said connector causes said plastically deformable region to deform plastically, and said non-deformable collar allows plastic deformation sufficient to prevent later removal of said connector but not to prevent limited radial float of said connector relative to said hole.

7. A connector according to claim 6, wherein said internal releasable engagement configuration comprises an internally screw-threaded portion.

8. A blind rivet connector for being passed through a bore in a workpiece, said workpiece have a non-rotation hole adjacent said bore, said connector clinched to prevent withdrawal, said connector comprising:
   an enlarged reaction head portion for being retained by the workpiece surface to one side of the bore, said head portion including an anti-rotation pin, said pin insertable into said non-rotation hole;
   a tubular portion capable of passing through said bore and including:
      remote from said head portion an end portion incorporating an internal releasable engagement configuration, and
      a plastically deformable region intermediate said end portion and said head portion,
   and a collar adjacent said head region,
   whereby, in use, the application of compression to clinch said connector causes said plastically deformable region to deform plastically, and said collar allows plastic deformation sufficient to prevent later removal of said connector but not to prevent limited radial float of said connector relative to said hole.

9. A connector according to claim 8, wherein said internal releasable engagement configuration comprises an internally screw-threaded portion.

10. A connector according to claim 8, wherein said anti-rotation pin comprises a tang interacting with said non-rotation hole.

* * * * *